United States Patent
Yang (10) Patent No.: US 11,356,386 B2
(45) Date of Patent: Jun. 7, 2022

(54) METHOD AND APPARATUS FOR SETTING LINK PRIORITY

(71) Applicant: HUAWEI TECHNOLOGIES CO., LTD., Guangdong (CN)

(72) Inventor: Feng Yang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 16 days.

(21) Appl. No.: 15/931,877

(22) Filed: May 14, 2020

(65) Prior Publication Data

US 2020/0274823 A1    Aug. 27, 2020

Related U.S. Application Data (63) Continuation of application No. PCT/CN2018/116604, filed on Nov. 21, 2018.

(30) Foreign Application Priority Data

Nov. 22, 2017    (CN) .......................... 201711173962.7

(51) Int. Cl.
*H04L 47/80* (2022.01)
*H04L 43/0852* (2022.01)
(Continued)

(52) U.S. Cl.
CPC ........ *H04L 47/805* (2013.01); *H04L 43/0852* (2013.01); *H04L 43/16* (2013.01); *H04L 67/1097* (2013.01)

(58) Field of Classification Search
CPC ... H04L 47/805; H04L 43/0852; H04L 43/16; H04L 67/1097
(Continued)

(56) References Cited

U.S. PATENT DOCUMENTS 9,680,931 B1    6/2017  Karnowski et al.
2005/0152289 A1*  7/2005  Nagata .................... H04L 45/02
                                                                  370/256
(Continued)

FOREIGN PATENT DOCUMENTS

CN    1722861 A    1/2006
CN    1852141 A    10/2006
(Continued)

OTHER PUBLICATIONS

Yao Dan et al., "Packet Schedule Algorithm Based on QCI Priority",Computer Engineering,vol. 37 No.9,May 2011,with an English abstract,total 3 pages.

*Primary Examiner* — Meng Vang
(74) *Attorney, Agent, or Firm* — Womble Bond Dickinson (US) LLP (57) ABSTRACT

A method is applied to a server and for providing a link priority between the server and a storage device. The server calculates an average latency of each of a plurality of links between the server and the storage device; then determines a latency interval to which the average latency of each link belongs; and determines a priority of each link based on a priority of the latency interval to which the average latency of each link belongs. At least two consecutive latency intervals are preset in the server, each latency interval represents a range of an average latency, and a priority is set for each latency interval. For latency intervals of adjacent priorities, a minimum latency value of a latency interval of a lower priority is greater than a maximum latency value of a latency interval of a higher priority.

15 Claims, 6 Drawing Sheets

(51) Int. Cl.
*H04L 43/16* (2022.01)
*H04L 67/1097* (2022.01)

(58) Field of Classification Search
USPC ........................................................ 370/252
See application file for complete search history.

(56) References Cited

U.S. PATENT DOCUMENTS

| | | | | |
|---|---|---|---|---|
| 2007/0192474 | A1* | 8/2007 | Decasper | H04L 67/1078 709/223 |
| 2008/0101362 | A1 | 5/2008 | Hu et al. | |
| 2008/0227412 | A1 | 9/2008 | Binowski et al. | |
| 2012/0008496 | A1* | 1/2012 | Saavedra | H04L 45/123 370/231 |
| 2013/0081015 | A1* | 3/2013 | Noma | G06F 9/45558 718/1 |
| 2013/0343207 | A1* | 12/2013 | Cook | H04L 43/0852 370/252 |
| 2014/0177455 | A1* | 6/2014 | Astigarraga | H04L 43/0858 370/252 |
| 2016/0105353 | A1* | 4/2016 | Cociglio | H04L 43/50 370/252 |
| 2016/0337223 | A1* | 11/2016 | Mackay | H04L 43/16 |

FOREIGN PATENT DOCUMENTS

| | | |
|---|---|---|
| CN | 1878051 A | 12/2006 |
| CN | 102300237 A | 12/2011 |
| CN | 102447980 A | 5/2012 |
| CN | 103023776 A | 4/2013 |
| CN | 103139070 A | 6/2013 |
| CN | 103873224 A | 6/2014 |
| CN | 106027293 A | 10/2016 |
| CN | 106685828 A | 5/2017 |
| CN | 106980463 A | 7/2017 |
| EP | 1005193 A2 | 5/2000 |
| WO | 2016009250 A1 | 1/2016 |
| WO | 2017124925 A1 | 7/2017 |

* cited by examiner

METHOD AND APPARATUS FOR SETTING LINK PRIORITY

CROSS-REFERENCE TO RELATED APPLICATIONS

This application is a continuation of International Application No. PCT/CN2018/116604, filed on Nov. 21, 2018, which claims priority to Chinese Patent Application No. 201711173962.7, filed on Nov. 22, 2017. The disclosures of the aforementioned applications are hereby incorporated by reference in their entireties.

TECHNICAL FIELD

This application relates to the field of storage technologies, and in particular, to a method and an apparatus for setting a link priority.

BACKGROUND

A storage area network (SAN) is a high-speed storage network with centralized management. The SAN allows a direct high-speed network connection to be established between a storage device and a server and implements centralized storage by using such a connection. In the SAN, a plurality of servers may perform serial or parallel access to a same storage device. There are a plurality of links between each server and the storage device, and all the plurality of links have a same preset priority. The server and the storage device perform data transmission based on the plurality of links.

In the prior art, when average latencies of some links between the server and the storage device are relatively high, the links cannot be effectively isolated. However, when data is transmitted over the link with the relatively high average latency, reliability of data transmission deteriorates. Consequently, a quality of service (QoS) requirement of a user for a service cannot be met.

SUMMARY

This application provides a method and an apparatus for setting a link priority, to resolve a problem in the prior art that reliability of data transmission deteriorates and a QoS requirement of a user for a service cannot be met because a link with a relatively high average latency between a server and a storage device cannot be isolated. The technical solutions are as follows:

According to a first aspect, a method for setting a link priority is provided, applied to a server, where the method includes: the server calculates an average latency of each of a plurality of links between the server and a storage device; then determines a latency interval to which the average latency of each link belongs; and determines a priority of each link based on a priority of the latency interval to which the average latency of each link belongs. At least two consecutive latency intervals are preset in the server, each latency interval represents a range of an average latency, and a priority is set for each latency interval. For latency intervals of adjacent priorities, a minimum latency value of a latency interval of a lower priority is greater than a maximum latency value of a latency interval of a higher priority.

Compared with the prior art, in this method, a link with a relatively high average latency can be effectively isolated and avoided for use in data transmission, thereby improving reliability of data transmission and meeting a QoS requirement of a user for a service.

In one embodiment, that the server calculates an average latency of each of a plurality of links between the server and a storage device may include: the server obtains latencies of n I/O requests transmitted over each link in preset duration, where n≥2; then determines an average value of the latencies of the n I/O requests transmitted over each link; and determines the average value of the latencies of the n I/O requests transmitted over each link as the average latency of each link. For example, the preset duration may be 5 minutes.

To improve accuracy of setting a link priority, the average value of the latencies of the n I/O requests may be a geometric mean of the latencies of the n I/O requests. A formula for calculating the geometric mean of the latencies of the n I/O requests transmitted over the link is as follows:

$$Pa = \sqrt[n]{p_1 \times p_2 \times p_3 \times \ldots \times p_j \times \ldots \times p_n},$$

where $p_j$ represents a latency of a $j^{th}$ I/O request in the latencies of the n I/O requests, and $1 \leq j \leq n$.

In this method, the server may calculate the average latency of each of the plurality of links between the server and the storage device in real time. In this way, the link with the relatively high average latency can be further detected and isolated in time.

In actual application, to reduce processing overheads, the server may alternatively determine the average latency of each link at intervals of specified duration. For example, the specified duration may be 10 minutes.

To obtain the at least two consecutive latency intervals, the server may divide a latency interval between a preset maximum average latency value Max and a preset minimum average latency value Min into the at least two consecutive latency intervals based on a logarithmic scale with a preset base α.

The at least two consecutive latency intervals include m consecutive latency intervals, where m≥2. Further, the server may determine a length of an $i^{th}$ latency interval in the m consecutive latency intervals, and the determining process may include: determining a length $L_i$ of the $i^{th}$ latency interval by using an interval division formula, where $1 \leq i \leq m$. The interval division formula is $L_i = \alpha^i - \alpha^{i-1}$, where α is the preset base.

In this method, after determining the priority of each link, the server may isolate a link of a low priority, and select a link of a high priority for data transmission. In one embodiment, the server may select a link of a highest priority for data transmission. For example, when there are a plurality of links of a highest priority, the server may use the plurality of links for data transmission according to an actual service requirement, or may select a specified quantity of links from the plurality of links for data transmission according to a preset rule (for example, a link number), or may randomly select one link from the plurality of links for data transmission. This is not limited in this embodiment of the present application.

In one embodiment, that the server calculates an average latency of each of a plurality of links between the server and a storage device may include: the server detecting a latency fluctuation value of each link, and then calculates the average latency of each of the plurality of links between the server and the storage device when a latency fluctuation value of at least one of the plurality of links exceeds a preset threshold.

The latency fluctuation value $s = \exp(\sqrt{((\Sigma_{j=1}^{n}(\ln(p_j/Pa)^2))/n)})$, where Pa represents the average value of the latencies of the n I/O requests transmitted over each link in the preset duration, $p_j$ represents a latency of a $j^{th}$ I/O request in the latencies of the n I/O requests, $1 \le j \le n$, and $n \ge 2$.

In actual application, various changes always occur between the server and the storage device. For example, the latencies of links between the server and the storage device fluctuate greatly. In addition, when a latency of one link between the server and the storage device fluctuates greatly, a remaining link between the server and the storage device is further affected usually. Therefore, the server may detect fluctuation of a latency of a link between the server and the storage device, so that when the latency of the link between the server and the storage device fluctuates greatly, the average latency of each of the plurality of links between the server and the storage device is calculated, thereby improving accuracy of setting a link priority. In this method, the server detects, based on the latency fluctuation value of the link, fluctuation of the latency of the link between the server and the storage device, and the latency fluctuation value is used to reflect a dispersion degree of the latencies of the n I/O requests transmitted over each link. When detecting the latency fluctuation value of each link, the server may calculate the latency fluctuation value of each link based on the average value of the latencies of the n I/O requests transmitted over each link in the preset duration and the latencies of the n I/O requests, where $n \ge 2$. The latency fluctuation value of each link is also a geometric standard deviation of the latencies of the n I/O requests transmitted over the corresponding link. The average value of the latencies of the n I/O requests may be the geometric mean of the latencies of the n I/O requests.

In one embodiment, the preset threshold to be compared with the latency fluctuation value may L/2, where L represents a length of a latency interval to which an average latency of a target link belongs, and the target link is any one of the at least one link. In other words, the server calculates the average latency of each of the plurality of links between the server and the storage device when the latency fluctuation value s of the at least one of the plurality of links is greater than or equal to L/2.

Further, the method may further include: when it is detected that the latency fluctuation value of the at least one of the plurality of links exceeds the preset threshold, the server determines the at least two consecutive latency intervals. That the server determines the at least two consecutive latency intervals may include: the server divides the preset maximum average latency value Max and the preset minimum average latency value Min into the at least two consecutive latency intervals based on a logarithmic scale with a preset base $\beta$, where $\beta$ is greater than $\alpha$. To more accurately obtain the latency interval to which the average latency of each link belongs, and further improve accuracy of setting a link priority, when it is detected that the latency fluctuation value of the at least one link exceeds the preset threshold, the server may re-determine the at least two consecutive latency intervals. The preset base $\alpha$ is adjusted to a larger number $\beta$, and the server re-determines the at least two consecutive latency intervals based on the preset base $\beta$.

In one embodiment, that the server calculates an average latency of each of a plurality of links between the server and a storage device may include: the server detects whether a change occurs on the links between the server and the storage device, and calculates the average latency of each of the plurality of links between the server and the storage device when a change occurs on the links between the server and the storage device.

In actual application, various changes always occur between the server and the storage device. For example, a change occurs on the links between the server and the storage device. In addition, when one link between the server and the storage device changes, a remaining link between the server and the storage device is further affected. Therefore, the server may detect whether a change occurs on the links between the server and the storage device, so that when a change occurs on the links between the server and the storage device, the average latency of each of the plurality of links between the server and the storage device is calculated, thereby improving accuracy of setting a link priority.

When detecting whether a change occurs on the links between the server and the storage device, the server may determine that a change occurs on the links between the server and the storage device when it is detected that the links between the server and the storage device meet at least one of the following conditions: there is a new link between the server and the storage device; an existing link between the server and the storage device is deleted; and a working status of an existing link between the server and the storage device changes.

In this method, the server may calculate the average latency of each of the plurality of links between the server and the storage device; determine the latency interval to which the average latency of each link belongs; and determine the priority of each link based on the priority of the latency interval to which the average latency of each link belongs. Further, when it is detected that the latency fluctuation value of the at least one link exceeds the preset threshold, or when it is detected that a change occurs on the links between the server and the storage device, the server may update the previously calculated average latency of each link to obtain a more accurate average latency of each link and improve accuracy of setting a link priority. In addition, when it is detected that the latency fluctuation value of the at least one link exceeds the preset threshold, the server may re-determine the at least two consecutive latency intervals used for setting a link priority, to improve accuracy of setting a link priority, thereby improving reliability of data transmission and meeting the QoS requirement of the user for the service.

According to a second aspect, an apparatus for setting a link priority is provided, applied to a server, where the apparatus for setting a link priority includes at least one module, and the at least one module is configured to implement the method for setting a link priority according to the first aspect.

According to a third aspect, an apparatus for setting a link priority is provided, applied to a server, where the apparatus includes a processor, a memory, a network interface, and a bus, where the bus is configured to connect the processor, the memory, and the network interface, the network interface is configured to implement a communication connection between the server and a storage device, and the processor is configured to execute a program stored in the memory, to implement the method for setting a link priority according to the first aspect.

According to a fourth aspect, a system for setting a link priority is provided, including a server and a storage device, where the server includes the apparatus for setting a link priority according to the second aspect, or includes the apparatus for setting a link priority according to the third aspect.

According to a fifth aspect, a computer readable storage medium is provided, where the computer readable storage medium stores an instruction, and when the instruction runs on a computer, the computer is enabled to perform the method for setting a link priority according to the first aspect.

According to a sixth aspect, a computer program product including an instruction is provided, where when the computer program product runs on a computer, the computer is enabled to perform the method for setting a link priority according to the first aspect.

Technical effects obtained from the second aspect to the sixth aspect are similar to technical effects obtained from the corresponding technical means in the first aspect. Details are not described herein again.

The technical solutions provided in this application bring the following beneficial effects:

The server can calculate the average latency of each of the plurality of links between the server and the storage device; then determine the latency interval to which the average latency of each link belongs; and determine the priority of each link based on the priority of the latency interval to which the average latency of each link belongs. The at least two consecutive latency intervals are preset in the server. Each latency interval represents the range of the average latency, and the priority is set for each latency interval. For the latency intervals of adjacent priorities, the minimum latency value of the latency interval of the lower priority is greater than the maximum latency value of the latency interval of the higher priority. Compared with the prior art, the link with the relatively high average latency can be isolated and avoided for use in data transmission, thereby improving reliability of data transmission and meeting the QoS requirement of the user for the service.

BRIEF DESCRIPTION OF DRAWINGS

FIG. 3-1 is a method flowchart of a method for setting a link priority according to an embodiment of the present application;

FIG. 3-2 is a flowchart of a method for calculating an average latency of each link according to an embodiment of the present application;

FIG. 3-3 is a schematic connection diagram of a server and a storage device in the prior art;

FIG. 6-1 is a schematic structural diagram of an apparatus for setting a link priority according to an embodiment of the present application; and FIG. 6-2 is a schematic structural diagram of another apparatus for setting a link priority according to an embodiment of the present application.

DESCRIPTION OF EMBODIMENTS

To make the objectives, technical solutions, and advantages of this application clearer, the following further describes implementations of this application in detail with reference to the accompanying drawings.

Figure 1:
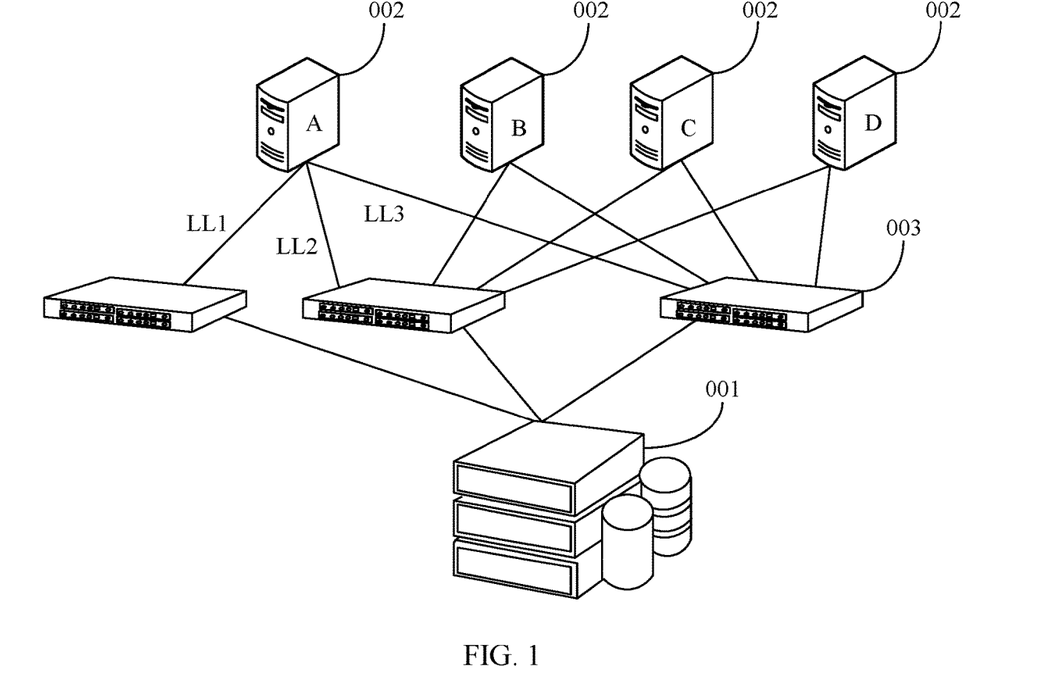
FIG. 1 is a schematic diagram of an implementation environment for embodiments of this application.

FIG. 1 is a schematic diagram of an implementation environment for embodiments of this application. The implementation environment may be a SAN architecture. The SAN architecture is an architecture of a high-speed storage network with centralized management. As shown in FIG. 1, the implementation environment may include a storage device 001 and a plurality of servers 002. The server 002 is connected to the storage device 001 by using a network device 003. The plurality of servers 002 may simultaneously access the storage device 001. There are a plurality of links between each server 002 and the storage device 001, and all the plurality of links have a same preset priority. A working status of the link directly affects processing of an upper-layer service. In the prior art, when average latencies of some links between a server and a storage device are relatively high, the links cannot be effectively isolated. However, when data is transmitted over the link with the relatively high average latency, reliability of data transmission deteriorates. Consequently, a QoS requirement of a user for a service cannot be met, and even service interruption is caused.

Figure 2:
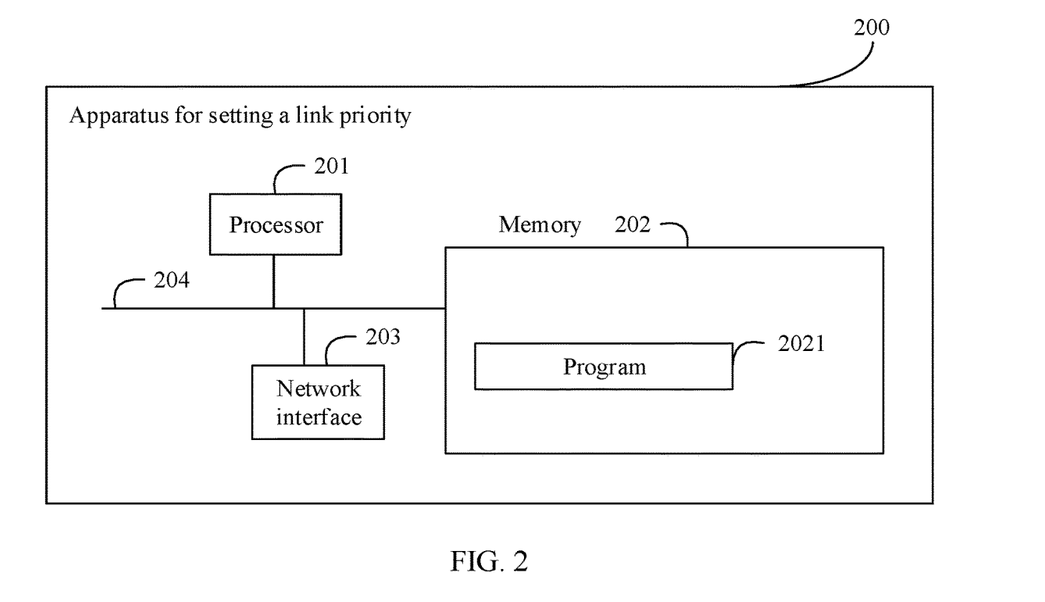
FIG. 2 is a schematic structural diagram of an apparatus for setting a link priority according to an embodiment of the present application.

FIG. 2 is a schematic structural diagram of an apparatus 200 for setting a link priority according to an embodiment of the present application. The apparatus 200 may be applied to the server 002 shown in FIG. 1. As shown in FIG. 2, the apparatus 200 includes a processor 201 (such as a CPU), a memory 202, a network interface 203, and a bus 204. The bus 204 is configured to connect the processor 201, the memory 202, and the network interface 203. The memory 202 may include a random access memory (RAM), or may include a non-volatile memory (NVM), for example, at least one magnetic disk storage. A communication connection between a server and a storage device is implemented by using the network interface 203. The memory 202 stores a program 2021, and the program 2021 is used to implement various application functions. The processor 201 is configured to execute the program 2021 stored in the memory 202 to implement the following method for setting a link priority.

According to the method for setting a link priority provided in the embodiments of the present application, a link with a relatively high average latency between a server and a storage device can be effectively isolated. For example, in a first feasible implementation, the server may calculate an average latency of each of a plurality of links between the server and the storage device; then determine a latency interval to which the average latency of each link belongs; and determine a priority of each link based on a priority of the latency interval to which the average latency of each link belongs. At least two consecutive latency intervals are preset in the server. Each latency interval represents a range of an average latency, and a priority is set for each latency interval. For latency intervals of adjacent priorities, a minimum latency value of a latency interval of a lower priority is greater than a maximum latency value of a latency interval of a higher priority. In a second feasible implementation, when a latency fluctuation value of at least one of a plurality of links between the server and the storage device exceeds a preset threshold, the server may calculate an average latency of each of the plurality of links; then determine a latency interval to which the average latency of each link belongs; and determine a priority of each link based on a priority of the latency interval to which the average latency of each link belongs. In a third feasible implementation, when a change occurs on links between the server and the storage device, the server may calculate an average latency of each of the plurality of links between the server and the storage device; then determine a latency interval to which the average latency of each link belongs; and determine a priority of each link based on a priority of the latency interval to which the average latency of each link belongs. The following describes the method for setting a link priority by using the three feasible implementations as examples.

Figure 31:
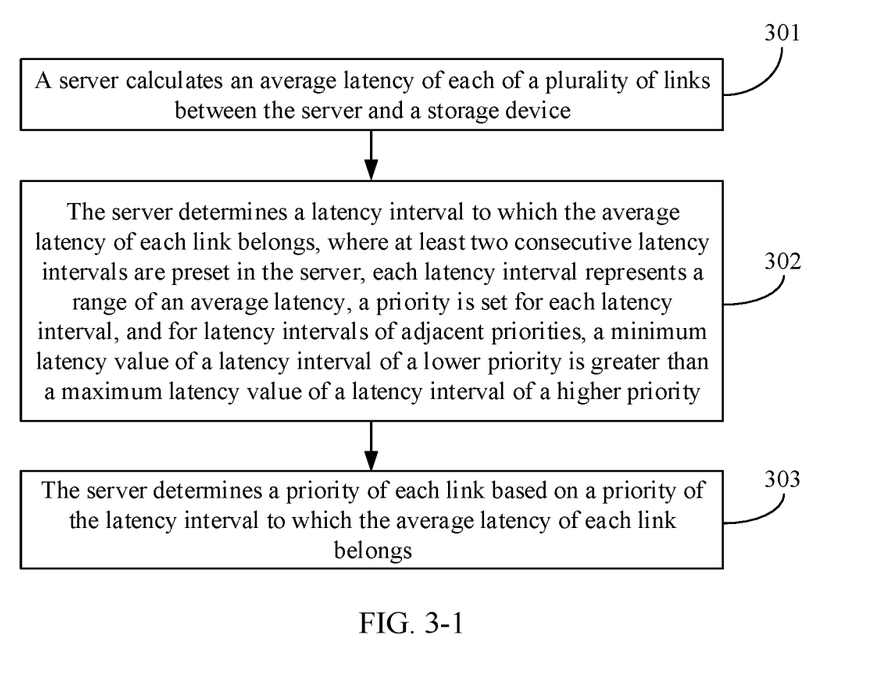

In the first feasible implementation, as shown in FIG. 3-1, the method for setting a link priority provided in this embodiment of the present application may include the following operations.

Operation 301: A server calculates an average latency of each of a plurality of links between the server and a storage device.

The server A in FIG. 1 is used as an example for description. It is assumed that there are three links, namely, LL1, LL2, and LL3, between the server A and the storage device. In this operation, the server A calculates an average latency of the LL1, an average latency of the LL2, and an average latency of the LL3. For example, the average latency in this embodiment of the present application may be measured in seconds.

Figure 32:
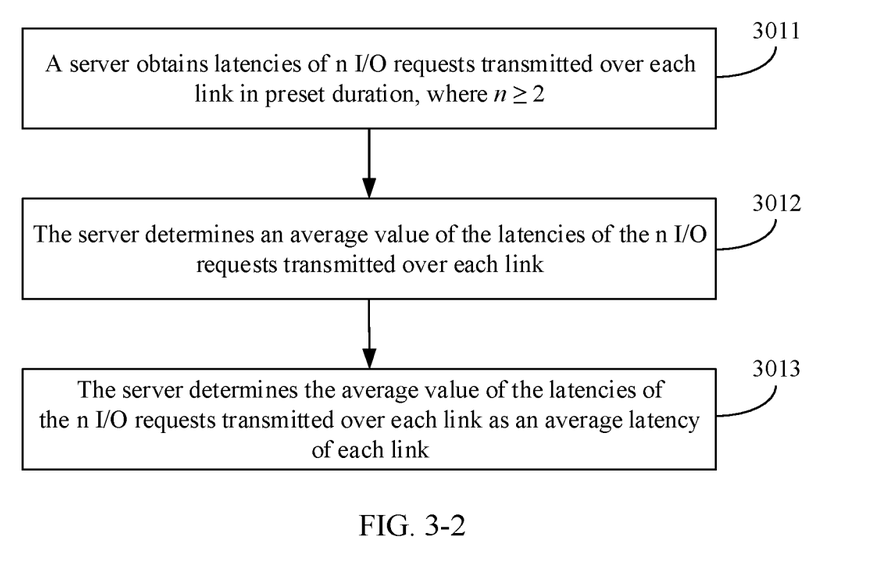

In one embodiment, as shown in FIG. 3-2, operation 301 may include the following operations.

Operation 3011: The server obtains latencies of n I/O requests transmitted over each link in preset duration, where n≥2.

The server obtains a latency of each of the n input/output (I/O) requests transmitted over each link in the preset duration, and there are n latencies in total, where n≥2. For example, the preset duration may be 5 minutes.

Operation 3012: The server determines an average value of the latencies of the n I/O requests transmitted over each link.

A geometric mean can better reflect stability of data. For a set of data, a larger geometric mean indicates that the set of data is more stable and has slighter fluctuation. To improve accuracy of setting a link priority, the average value of the latencies of the n I/O requests may be a geometric mean of the latencies of the n I/O requests.

Operation 3013: The server determines the average value of the latencies of the n I/O requests transmitted over each link as the average latency of each link.

The server determines an average value, obtained in operation 3012, of latencies of n I/O requests transmitted over a link as an average latency of the link. When the average value of the latencies of the n I/O requests is the geometric mean of the latencies of the n I/O requests, the server determines the geometric mean of the latencies of the n I/O requests transmitted over each link as the average latency of each link.

A latency of each I/O request is equal to a difference between a receiving moment of the I/O request and a sending moment of the I/O request. For example, if the receiving moment of the I/O request is t2, and the sending moment of the I/O request is t1, the latency of the I/O request is Δt=t2−t1.

For each link, when the average value of the latencies of the n I/O requests is the geometric mean of the latencies of the n I/O requests, a formula used to calculate the geometric mean Pa of the latencies of the n I/O requests transmitted over the link is as follows:

$$Pa = \sqrt[n]{p_1 \times p_2 \times p_3 \times \ldots \times p_j \times \ldots \times p_n},$$

where $p_j$ represents a $j^{th}$ latency in the latencies of the n I/O requests, and $1 \leq j \leq n$.

Figure 33:
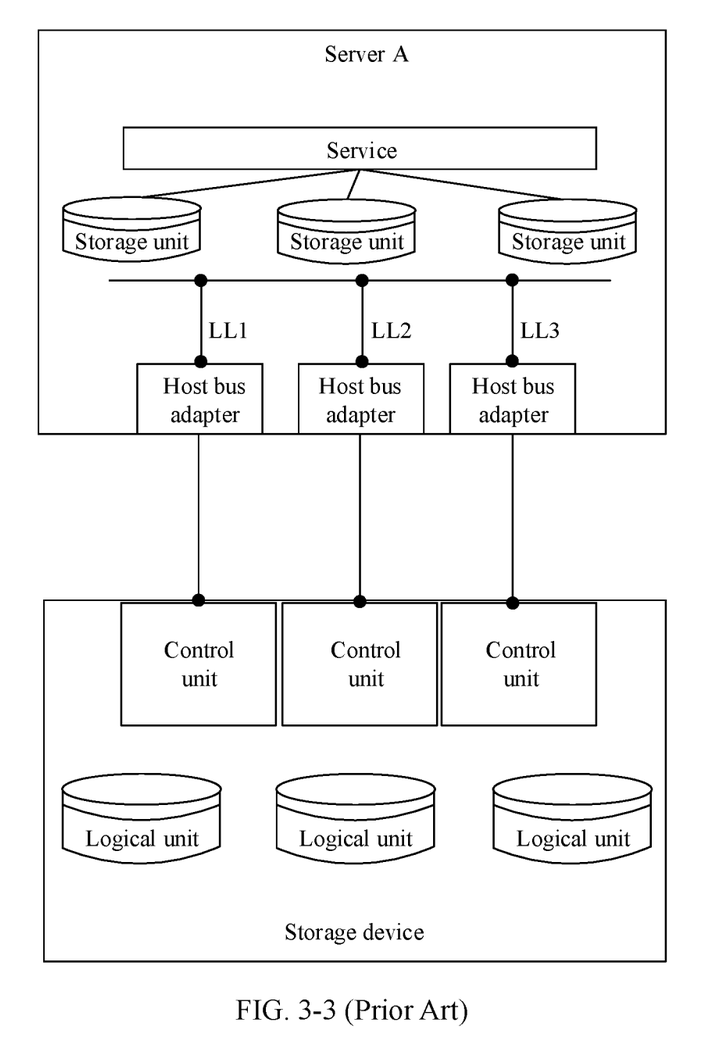

FIG. 3-3 is a schematic connection diagram of the server A and the storage device. The server A includes a storage unit and a host bus adapter, and the storage device includes a logical unit and a control unit. Each I/O request is transmitted over a link implemented by one host bus adapter and one control unit.

It is assumed that the preset duration is 5 minutes. The link LL1 between the server A and the storage device is used as an example for description. For the LL1, the server A obtains a latency of each of 100 I/O requests transmitted over the LL1 within 5 minutes, to obtain latencies of the 100 I/O requests. Then, the server A may obtain an average latency Pa1 of the LL1 according to the formula used to calculate the geometric mean. Similarly, the server A may obtain an average latency Pa2 of LL2 and an average latency Pa3 of LL3.

In this operation, the server may calculate the average latency of each of the plurality of links between the server and the storage device in real time, that is, the server may calculate the average latency of each link in a smallest time unit. In this way, the link with the relatively high average latency can be further detected and isolated in time.

In actual application, to reduce processing overheads, the server may alternatively determine the average latency of each link at intervals of specified duration. For example, the specified duration may be 10 minutes.

Operation 302: The server determines a latency interval to which the average latency of each link belongs, where at least two consecutive latency intervals are preset in the server, each latency interval represents a range of an average latency, a priority is set for each latency interval, and for latency intervals of adjacent priorities, a minimum latency value of a latency interval of a lower priority is greater than a maximum latency value of a latency interval of a higher priority.

The priority of the latency interval may be represented by using a number. A larger number indicates that the latency interval has a higher priority. For example, three consecutive latency intervals are preset in the server. The first latency interval is [1, 10), and a priority of the first latency interval is 3. The second latency interval is [10, 100), and a priority of the second latency interval is 2. The third latency interval is [100, 1000], and a priority of the third latency interval is 1. The priority of the second latency interval is higher than the priority of the third latency interval, and is lower than the priority of the first latency interval.

In one embodiment, the server may divide a latency interval between a preset maximum average latency value Max and a preset minimum average latency value Min into the at least two consecutive latency intervals based on a logarithmic scale with a preset base α.

The server A in the implementation environment shown in FIG. 1 is used as an example for description. The server A may divide the preset maximum average latency value Max and the preset minimum average latency value Min into the at least two consecutive latency intervals based on the logarithmic scale with a preset base α.

The at least two consecutive latency intervals include m consecutive latency intervals, and m≥2. The preset minimum average latency value Min is 1, and the preset maximum average latency value Max is $\alpha^m$. An $i^{th}$ ($1 \leq i \leq m$) latency interval in the m consecutive latency intervals may be represented as $[\alpha^{i-1}, \alpha^i)$ or $(\alpha^{i-1}, \alpha^i]$. Whether the latency interval is left-closed and right-open, or left-open and right-closed is not limited in this embodiment of the present application. For example, in the m consecutive latency intervals, the first latency interval is represented as $[1, \alpha)$; the second latency interval is represented as $[\alpha, \alpha^2)$; the third latency interval is represented as $[\alpha^2, \alpha^3)$; and the following latency interval is represented by analogy, and the $m^{th}$ latency interval is represented as $[\alpha^{m-1}, \alpha^m]$. Each latency interval represents a range of an average latency, and a priority is set for each latency interval. For latency intervals of adjacent priorities, a minimum latency value of a latency interval of a lower priority is greater than a maximum latency value of a latency interval of a higher priority. For example, a priority of the first latency range $[1, \alpha)$ is higher than a priority of the second latency range $[\alpha, \alpha^2)$, and a minimum latency value $\alpha$ of the second latency range $[\alpha, \alpha^2)$ is greater than a maximum latency value of the first latency range $[1, \alpha)$.

Further, the server may determine a length of the $i^{th}$ latency interval in the m consecutive latency intervals. The determining process may include:

determining a length $L_i$ of the $i^{th}$ latency interval by using an interval division formula, where $1 \leq i \leq m$.

The interval division formula is $L_i = \alpha^i - \alpha^{i-1}$, where $\alpha$ is the preset base.

For example, in the m consecutive latency intervals, a length of the first latency interval is $L_1 = \alpha - 1$; a length of the second latency interval is $L_2 = \alpha^2 - \alpha$; a length of the third latency interval is $L_3 = \alpha^3 - \alpha^2$; and a length of the $m^{th}$ latency interval is $L_m = \alpha^m - \alpha^{m-1}$. For the latency intervals of adjacent priorities, the minimum latency value of the latency interval of the lower priority is greater than the maximum latency value of the latency interval of the higher priority. Therefore, it can be learned that in this embodiment of the present application, a length of a latency interval is inversely proportional to a priority of the latency interval. In other words, a smaller length of the latency interval indicates that the latency interval has a higher priority.

A process of determining a length of a latency interval is described by using an example in which the preset minimum average latency value Min is 1, the preset maximum average latency value Max is 1000, and the preset base $\alpha$ is 10. The server A may obtain three consecutive latency intervals. The first latency interval is $[1, 10)$, a length of the first latency interval $L_1 = 10 - 1 = 9$, and a priority of the first latency interval is 3. The second latency interval is $[10, 100)$, a length of the second latency interval $L_2 = 100 - 10 = 90$, and a priority of the second latency interval is 2. The third latency interval is $[100, 1000]$, a length of the third latency interval $L_3 = 1000 - 100 = 900$, and a priority of the third latency interval is 1.

After calculating the average latency of each of the plurality of links between the server and the storage device, the server determines, from the at least two consecutive latency intervals obtained in advance, the latency interval to which the average latency of each link belongs. The three links, namely, the LL1, LL2, and LL3, between the server A and the storage device in FIG. 1 are used as examples for description. It is assumed that the server A obtains three consecutive latency intervals. The first latency interval is $[1, 10)$, and a priority of the first latency interval is 3. The second latency interval is $[10, 100)$, and a priority of the second latency interval is 2. The third latency interval is $[100, 1000]$, and a priority of the third latency interval is 1. The priority of the first latency interval is the highest, and the priority of the third latency interval is the lowest. If the server A determines, through calculation based on operation 301, that the average latency Pa1 of the LL1 is 5, the average latency Pa2 of the LL2 is 7, and the average latency Pa3 of the LL3 is 600, the server A may determine, based on operation 302, that a latency interval to which the average latency Pa1 of the LL1 belongs is $[1, 10)$, a latency interval to which the average latency Pa2 of the LL2 belongs is $[1, 10)$, and a latency interval to which the average latency Pa3 of the LL3 belongs is $[100, 1000]$.

Operation 303: The server determines a priority of each link based on a priority of the latency interval to which the average latency of each link belongs.

The server determines the priority of each link based on the priority of the latency interval, determined in operation 302, to which the average latency of each link belongs. For example, referring to FIG. 1, the server A determines that the latency interval to which the average latency Pa1 of the LL1 belongs is $[1, 10)$, the latency interval to which the average latency Pa2 of the LL2 belongs is $[1, 10)$, and the latency interval to which the average latency Pa3 of the LL3 belongs is $[100, 1000]$. Because the priority of the latency interval $[1, 10)$ is 3, and the priority of the latency interval $[100, 1000]$ is 1, the server may determine that a priority of the LL1 is 3, a priority of the LL2 is 3, and a priority of the LL3 is 1. Until now, the server completes a process of setting a priority of each link.

After determining the priority of each link, the server may isolate a link of a low priority, and select a link of a high priority for data transmission.

In one embodiment, the server may select a link of a highest priority for data transmission. For example, when there are a plurality of links of a highest priority, the server may use the plurality of links for data transmission according to an actual service requirement, or may select a specified quantity of links from the plurality of links for data transmission according to a preset rule (for example, a link number), or may randomly select one link from the plurality of links for data transmission. This is not limited in this embodiment of the present application.

It is assumed that in FIG. 1, the latency interval to which the average latency Pa1 of the LL1 belongs is $[1, 10)$, and the priority of the LL1 is 3; the latency interval to which the average latency Pa2 of the LL2 belongs is $[1, 10)$, and the priority of the LL2 is 3; and the latency interval to which the average latency Pa3 of the LL3 belongs is $[100, 1000]$, and the priority of the LL3 is 1. Because the priority of the LL1 is 3 and the priority of the LL2 are higher than the priority of the LL3, the server A may select the LL1 and the LL2 for data transmission.

It should be further noted that, to isolate the link with the relatively high latency, in the prior art, a host bus adapter of a server may return an I/O error code to detect the link with the relatively high average latency, and then isolate the link with the relatively high average latency. However, most host bus adapters do not return an I/O error code. As a result, the server cannot isolate the link with the relatively high average latency. Therefore, reliability of data transmission deteriorates and the QoS requirement of the user for the service cannot be met. However, according to the method for setting a link priority provided in this embodiment of the present application, the average latency of each of the plurality of links between the server and the storage device may be calculated, the latency interval to which the average latency of each link belongs may be determined, and then the priority of each link may be determined based on the priority of the latency interval to which the average latency of each link belongs. In this method, when average latencies of some links between the server and the storage device are relatively high, the links can be isolated in time. Finally, a service can always be processed on a link with a relatively low average latency, thereby improving the reliability of data transmission and meeting the QoS requirement of the user for the service.

In conclusion, according to the method for setting a link priority provided in this embodiment of the present application, the server can calculate the average latency of each of the plurality of links between the server and the storage device; then determine the latency interval to which the average latency of each link belongs; and determine the priority of each link based on the priority of the latency interval to which the average latency of each link belongs. The at least two consecutive latency intervals are preset in the server. Each latency interval represents the range of the average latency, and the priority is set for each latency interval. For the latency intervals of adjacent priorities, the minimum latency value of the latency interval of the lower priority is greater than the maximum latency value of the latency interval of the higher priority. Compared with the prior art, in this method, the link with the relatively high average latency can be isolated and avoided for use in data transmission, thereby improving reliability of data transmission and meeting the QoS requirement of the user for the service.

Figure 4:
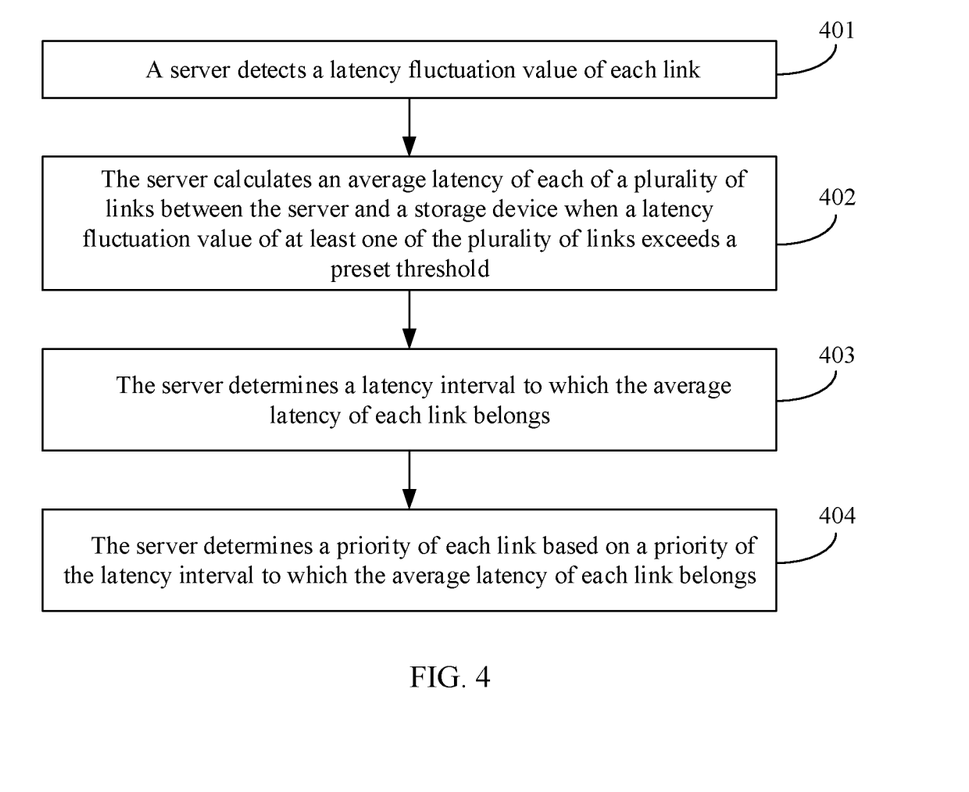
FIG. 4 is a method flowchart of another method for setting a link priority according to an embodiment of the present application.

In the second feasible implementation, when a latency of a link fluctuates greatly, the server may calculate the average latency of each of the plurality of links between the server and the storage device, so as to complete setting a link priority. As shown in FIG. 4, the method for setting a link priority may include the following operations.

Operation 401: The server detects a latency fluctuation value of each link.

In actual application, various changes always occur between the server and the storage device. For example, the latencies of the links between the server and the storage device fluctuate greatly. In addition, when a latency of one link between the server and the storage device fluctuates greatly, a remaining link between the server and the storage device is further affected usually. Therefore, the server may detect fluctuation of a latency of a link between the server and the storage device, so that when the latency of the link between the server and the storage device fluctuates greatly, the average latency of each of the plurality of links between the server and the storage device is calculated, thereby improving accuracy of setting a link priority.

In one embodiment, the server may detect, based on the latency fluctuation value of the link, fluctuation of the latency of the link between the server and the storage device, and the latency fluctuation value is used to reflect a dispersion degree of latencies of n I/O requests transmitted over each link.

When detecting the latency fluctuation value of each link, the server may calculate the latency fluctuation value of each link based on an average value of latencies of n I/O requests transmitted over each link in preset duration and the latencies of the n I/O requests, where n≥2. The latency fluctuation value of each link is also a geometric standard deviation of the latencies of the n I/O requests transmitted over the corresponding link. The average value of the latencies of the n I/O requests may be a geometric mean of the latencies of the n I/O requests. For example, the preset duration may be 5 minutes.

A detected latency fluctuation value $s = \exp(\sqrt{((\Sigma_{j=1}^{n}(\ln(p_j/Pa)^2))/n)})$, where Pa represents the average value of the latencies of the n I/O requests transmitted over each link in the preset duration, $p_j$ represents a latency of a $j^{th}$ I/O request in the latencies of the n I/O requests, and $1 \leq j \leq n$.

The link LL1 between the server A and the storage device in FIG. 1 is used as an example for description. For the LL1, the server A calculates a latency fluctuation value of the LL1 based on a geometric mean of latencies of 100 I/O requests transmitted over the LL1 in the preset duration and the latencies of the 100 I/O requests. Similarly, the server A may obtain a latency fluctuation value of the LL2 and a latency fluctuation value of the LL3.

In this embodiment of the present application, the server may detect the latency fluctuation value of each link in real time. In this way, the link with the relatively high average latency can be further detected and isolated in time.

In actual application, to reduce processing overheads, the server may alternatively detect the latency fluctuation value of each link at intervals of specified duration. For example, the specified duration may be 10 minutes.

Operation 402: The server calculates the average latency of each of the plurality of links between the server and the storage device when a latency fluctuation value of at least one of the plurality of links exceeds a preset threshold.

When the latency fluctuation value of the at least one of the plurality of links exceeds the preset threshold, it indicates that the latency of the link fluctuates greatly. In this case, the server calculates the average latency of each of the plurality of links between the server and the storage device. As shown in FIG. 3-2, that the server calculates the average latency of each of the plurality of links between the server and the storage device may include:

The server obtains the latencies of the n I/O requests transmitted over each link in the preset duration, where n≥2; then determines the average value of the latencies of the n I/O requests transmitted over each link; and determines the average value of the latencies of the n I/O requests transmitted over each link as the average latency of each link. To improve accuracy of setting a link priority, the average value of the latencies of the n I/O requests may be a geometric mean of the latencies of the n I/O requests. For a process of calculating the average latency of each link, refer to the foregoing operation 3011 to operation 3013, and details are not described herein again.

Operation 403: The server determines a latency interval to which the average latency of each link belongs.

At least two consecutive latency intervals are preset in the server. Each latency interval represents a range of an average latency, and a priority is set for each latency interval. For latency intervals of adjacent priorities, a minimum latency value of a latency interval of a lower priority is greater than a maximum latency value of a latency interval of a higher priority.

In this embodiment of the present application, the server may divide a latency interval between a preset maximum average latency value Max and a preset minimum average latency value Min into the at least two consecutive latency intervals based on a logarithmic scale with a preset base α. For a process of obtaining the at least two consecutive latency intervals, refer to related descriptions in operation 302.

The at least two consecutive latency intervals include m consecutive latency intervals, where m≥2. Further, the server may determine a length of each of the m consecutive latency intervals, and the process may include: determining a length $L_i$ of the $i^{th}$ latency interval by using an interval division formula, where $1 \leq i \leq m$. The interval division formula is $L_i = \alpha^i - \alpha^{i-1}$, where $\alpha$ is the preset base. For the process of determining the length of each latency interval, refer to related descriptions in operation 302.

After calculating the average latency of each of the plurality of links between the server and the storage device, the server determines, from the at least two consecutive latency intervals obtained in advance, the latency interval to which the average latency of each link belongs. For the process, refer to operation 302.

It should be further noted that in one embodiment, the preset threshold in operation 402 may be L/2, where L represents a length of a latency interval to which an average latency of a target link belongs, and the target link is any one of the at least one link in operation 402. In other words, the server calculates the average latency of each of the plurality of links between the server and the storage device when the latency fluctuation value s of the at least one of the plurality of links is greater than or equal to L/2. For example, it is assumed that a latency fluctuation value s of the LL1 between the server A and the storage device in FIG. 1 is 5. A latency interval to which an average latency Pa1 of the LL1 belongs is [1, 10), and a length $L_1$ of the latency interval is 10−1=9. The latency fluctuation value s is compared with the $L_2$. Because s≥L/2 is satisfied, the server A calculates the average latency of the LL1, an average latency of the LL2, and an average latency of the LL3.

Further, the method may further include: when it is detected that the latency fluctuation value of the at least one of the plurality of links exceeds the preset threshold, the server determines the at least two consecutive latency intervals. In one embodiment, that the server determines the at least two consecutive latency intervals may include: the server divides the preset maximum average latency value Max and the preset minimum average latency value Min into the at least two consecutive latency intervals based on a logarithmic scale with a preset base $\beta$, where $\beta$ is greater than $\alpha$.

When it is detected that the latency fluctuation value of the at least one of the plurality of links exceeds the preset threshold, it indicates that the latency of the link fluctuates greatly. To more accurately obtain the latency interval to which the average latency of each link belongs and improve accuracy of setting a link priority, the server may re-determine the at least two consecutive latency intervals. The preset base $\alpha$ is adjusted to a larger number $\beta$, and the server re-determines the at least two consecutive latency intervals based on the preset base $\beta$. Then, the server determines, based on the re-determined at least two consecutive latency intervals, a latency interval to which the average latency of each link belongs, and determine a priority of each link based on a priority of the latency interval to which the average latency of each link belongs.

Operation 404: The server determines a priority of each link based on a priority of the latency interval to which the average latency of each link belongs.

After determining the priority of each link, the server may isolate a link of a low priority, and select a link of a high priority for data transmission.

For operation 404, refer to operation 303.

In conclusion, according to the method for setting a link priority provided in this embodiment of the present application, when the latency fluctuation value of the at least one of the plurality of links between the server and the storage device exceeds the preset threshold, the server can calculate the average latency of each of the plurality of links between the server and the storage device; then determine the latency interval to which the average latency of each link belongs; and determine the priority of each link based on the priority of the latency interval to which the average latency of each link belongs. Compared with the prior art, in this method, the link with the relatively high average latency can be isolated in time and avoided for use in data transmission, thereby improving reliability of data transmission and meeting the QoS requirement of the user for the service.

Figure 5:
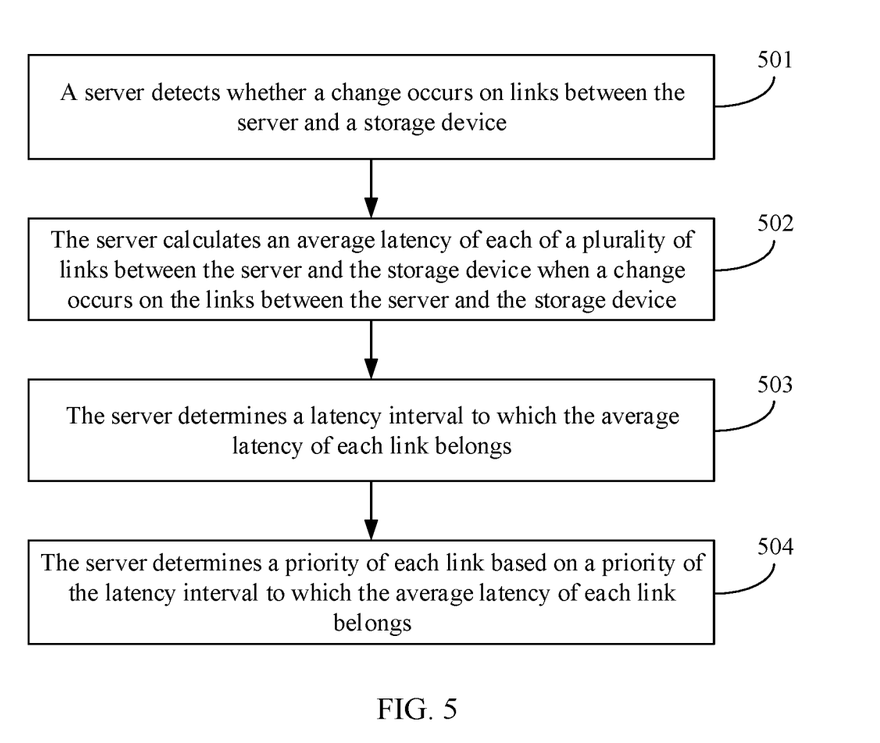
FIG. 5 is a method flowchart of still another method for setting a link priority according to an embodiment of the present application.

In the third feasible implementation, when a change occurs on the links between the server and the storage device, the server may calculate the average latency of each of the plurality of links between the server and the storage device, so as to complete setting a link priority. As shown in FIG. 5, the method for setting a link priority may include the following operations.

Operation 501: The server detects whether a change occurs on the links between the server and the storage device.

In actual application, various changes always occur between the server and the storage device. For example, a change occurs on the links between the server and the storage device. In addition, when one link between the server and the storage device changes, a remaining link between the server and the storage device is further affected usually. Therefore, the server may detect whether a change occurs on the links between the server and the storage device, so that when a change occurs on the links between the server and the storage device, the average latency of each of the plurality of links between the server and the storage device may be calculated.

The server may determine that a change occurs on the links between the server and the storage device when it is detected that the links between the server and the storage device meet at least one of the following conditions:
 there is a new link between the server and the storage device;
 an existing link between the server and the storage device is deleted; and
 a working status of an existing link between the server and the storage device changes.

For example, when an existing link is faulty, the server may determine that a working status of the existing link changes.

In one embodiment, the server may detect, in a real-time scanning manner, whether there is a new link between the server and the storage device, whether an existing link is deleted, and whether a working status of an existing link changes. For a detection process, refer to the prior art.

The server A in FIG. 1 is used as an example for description. When the server A detects that there is a new link LL4 between the server A and the storage device, the server A may determine that a change occurs on the links between the server A and the storage device. Alternatively, when the server A detects that the LL1 between the server A and the storage device is deleted, the server A may determine that a change occurs on the links between the server A and the storage device. Alternatively, when the server A detects that a working status of the LL2 between the server A and the storage device changes, for example, the LL2 is faulty, the server A may determine that a change occurs on the links between the server A and the storage device.

In this embodiment of the present application, the server may detect, in real time, whether a change occurs on the links between the server and the storage device. In this way, the link with the relatively high average latency can be further detected and isolated in time.

In actual application, to reduce processing overheads, the server may alternatively detect, at intervals of specified duration, whether a change occurs on the links between the server and the storage device. For example, the specified duration may be 10 minutes.

Operation 502: The server calculates the average latency of each of the plurality of links between the server and the storage device when a change occurs on the links between the server and the storage device.

For example, it is assumed that the server A in FIG. 1 detects that there is a new link LL4 between the server A and the storage device. The server A calculates an average latency Pa1 of the LL1, an average latency Pa2 of the LL2, an average latency Pa3 of the LL3, and an average latency Pa4 of the LL4.

For example, it is assumed that the server A in FIG. 1 detects that the LL1 between the server A and the storage device is deleted. The server A calculates an average latency Pa2 of the LL2 and an average latency Pa3 of the LL3.

For example, it is assumed that the server A in FIG. 1 detects that the LL2 between the server A and the storage device is faulty. The server A calculates an average latency Pa1 of the LL1 and an average latency Pa3 of the LL3.

As shown in FIG. 3-2, that the server calculates the average latency of each of the plurality of links between the server and the storage device may include:

The server obtains latencies of n I/O requests transmitted over each link in preset duration, where n≥2; then determines an average value of the latencies of the n I/O requests transmitted over each link; and determines the average value of the latencies of the n I/O requests transmitted over each link as the average latency of each link. To improve accuracy of setting a link priority, the average value of the latencies of the n I/O requests may be a geometric mean of the latencies of the n I/O requests. For a process of calculating the average latency of each link, refer to the foregoing operation 3011 to operation 3013, and details are not described herein again.

Operation 503: The server determines a latency interval to which the average latency of each link belongs.

At least two consecutive latency intervals are preset in the server. Each latency interval represents a range of an average latency, and a priority is set for each latency interval. For latency intervals of adjacent priorities, a minimum latency value of a latency interval of a lower priority is greater than a maximum latency value of a latency interval of a higher priority.

In this embodiment of the present application, the server may divide a latency interval between a preset maximum average latency value Max and a preset minimum average latency value Min into the at least two consecutive latency intervals based on a logarithmic scale with a preset base α. For a process of obtaining the at least two consecutive latency intervals, refer to related descriptions in operation 302.

For example, the at least two consecutive latency intervals include m consecutive latency intervals, where m≥2. Further, the server may determine a length of each of the m consecutive latency intervals, and the process may include: determining a length $L_i$ of the $i^{th}$ latency interval by using an interval division formula, where 1≤i≤m. The interval division formula is $L_i=\alpha^i-\alpha^{i-1}$, where α is the preset base. For the process of determining the length of each latency interval, refer to related descriptions in operation 302.

After calculating the average latency of each of the plurality of links between the server and the storage device, the server determines, from the at least two consecutive latency intervals obtained in advance, the latency interval to which the average latency of each link belongs. For the process, refer to operation 302.

It is assumed that the server A obtains three consecutive latency intervals. The first latency interval is [1, 10), and a priority of the first latency interval is 3. The second latency interval is [10, 100), and a priority of the second latency interval is 2. The third latency interval is [100, 1000], and a priority of the third latency interval is 1. The priority of the first latency interval is the highest, and the priority of the third latency interval is the lowest. If the server A determines, through calculation based on operation 501 and operation 502, that the average latency of the new link LL4 is 9, the average latency of the LL1 is 4, the average latency of the LL2 is 20, and the average latency of the LL3 is 300, the server A may determine, based on operation 503, that a latency interval to which the average latency of the LL1 belongs is [1, 10), a latency interval to which the average latency of the LL2 belongs is [10, 100), a latency interval to which the average latency of the LL3 belongs is [100, 1000], and a latency interval to which the average latency of the new link LL4 belongs is [1, 10).

Operation 504: The server determines a priority of each link based on a priority of the latency interval to which the average latency of each link belongs.

After determining the priority of each link, the server may isolate a link of a low priority, and select a link of a high priority for data transmission.

For operation 504, refer to operation 303.

In conclusion, according to the method for setting a link priority provided in this embodiment of the present application, when a change occurs on the links between the server and the storage device, the server can calculate the average latency of each of the plurality of links between the server and the storage device; then determine the latency interval to which the average latency of each link belongs; and determine the priority of each link based on the priority of the latency interval to which the average latency of each link belongs. Compared with the prior art, in this method, the link with the relatively high average latency can be isolated in time and avoided for use in data transmission, thereby improving reliability of data transmission and meeting the QoS requirement of the user for the service.

It should be noted that a sequence of the operations of the method for setting a link priority provided in the embodiment of the present application may be properly adjusted, and a operation may be correspondingly added or removed based on a situation. Any variation readily figured out by a person skilled in the art within the technical scope disclosed in the present application shall fall within the protection scope of this application, and details are not described herein.

Figure 61:
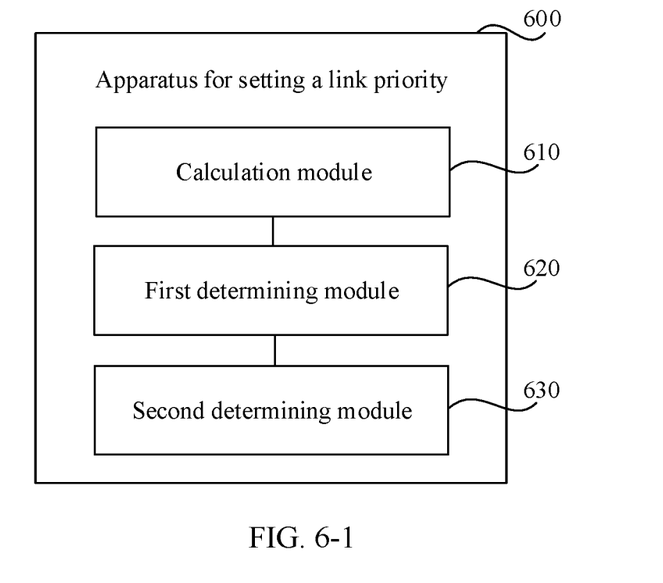

According to an embodiment of the present application, an apparatus 600 for setting a link priority is provided. The apparatus for setting a link priority may be applied to the server 002 shown in FIG. 1. As shown in FIG. 6-1, the apparatus 600 includes:

a calculation module 610, configured to perform operation 301 in the foregoing embodiment;

a first determining module 620, configured to perform operation 302, operation 403, or operation 503 in the foregoing embodiments; and a second determining module 630, configured to perform operation 303, operation 404, or operation 504 in the foregoing embodiments.

In one embodiment, the calculation module 610 is configured to perform operation 401 and operation 402 in the foregoing embodiment.

In one embodiment, the calculation module 610 is configured to perform operation 501 and operation 502 in the foregoing embodiment.

In one embodiment, the calculation module 610 is configured to perform operation 3011 to operation 3013 in the foregoing embodiment.

Figure 62:
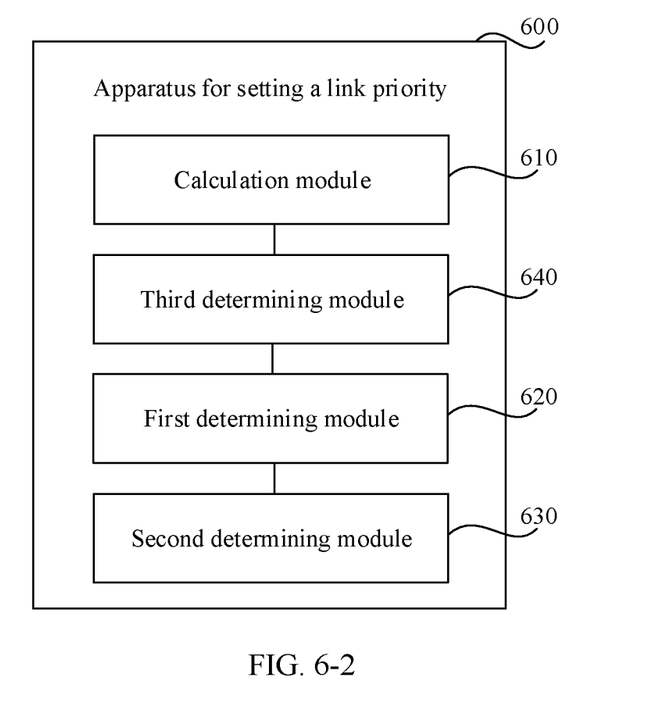

Further, as shown in FIG. 6-2, the apparatus 600 may further include:

a third determining module 640, configured to determine at least two consecutive latency intervals when it is detected that a latency fluctuation value of at least one of a plurality of links exceeds a preset threshold.

For meanings of other signs in FIG. 6-2, refer to FIG. 6-1.

In conclusion, according to the apparatus for setting a link priority provided in this embodiment of the present application, the server can calculate the average latency of each of the plurality of links between the server and the storage device; then determine the latency interval to which the average latency of each link belongs; and determine the priority of each link based on the priority of the latency interval to which the average latency of each link belongs. The at least two consecutive latency intervals are preset in the server. Each latency interval represents the range of the average latency, and the priority is set for each latency interval. For latency intervals of adjacent priorities, the minimum latency value of the latency interval of the lower priority is greater than the maximum latency value of the latency interval of the higher priority. Compared with the prior art, the link with the relatively high average latency can be isolated in time and avoided for use in data transmission, thereby improving reliability of data transmission and meeting the QoS requirement of the user for the service.

According to an embodiment of the present application, a system for setting a link priority is provided, including a server and a storage device.

The server includes the apparatus for setting a link priority shown in FIG. 6-1 or FIG. 6-2, or includes the apparatus for setting a link priority shown in FIG. 2.

It may be clearly understood by a person skilled in the art that, for the purpose of convenient and brief description, for a detailed working process of the foregoing system, apparatus, and modules, refer to a corresponding process in the foregoing method embodiment, and details are not described herein again.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a computer network, or another programmable apparatus. The computer instructions may be stored in a computer readable storage medium, or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In the several embodiments provided in this application, it should be understood that the disclosed apparatus and method may be implemented in another manner. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may understand that all or some of the operations of the embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method for setting a link priority, applied to a server, wherein the method comprises:
    calculating an average latency of each of a plurality of links between the server and a storage device, including detecting a latency fluctuation value of each link; and
    calculating the average latency of each of the plurality of links between the server and the storage device when a latency fluctuation value of at least one of the plurality of links is greater or equal to a preset threshold;
    determining a latency interval to which the average latency of each link belongs, wherein at least two consecutive latency intervals are preset in the server, each latency interval represents a range of an average latency, a priority is set for each latency interval, and for latency intervals of adjacent priorities, a minimum latency value of a latency interval of a lower priority is greater than a maximum latency value of a latency interval of a higher priority;
    determining a priority of each link based on a priority of the latency interval to which the average latency of each link belongs; and
    selecting one or more links with a highest priority for data transmission, wherein the data is transmitted using the selected one or more links.

2. The method according to claim 1, wherein the latency fluctuation value $s=\exp(\sqrt{((\Sigma_{j=1}{}^{n}(\ln(p_j/Pa)^2))/n)})$, Pa represents an average value of latencies of n input/output (I/O) requests transmitted over each link in preset duration, $p_j$ represents a latency of a $j^{th}$ I/O request in the latencies of the n I/O requests, $1 \leq j \leq n$, and $n \geq 2$.

3. The method according to claim 1, wherein the calculating an average latency of each of a plurality of links between the server and a storage device comprises:
   detecting whether a change occurs on the links between the server and the storage device; and
   calculating the average latency of each of the plurality of links between the server and the storage device when a change occurs on the links between the server and the storage device.

4. The method according to claim 1, wherein the calculating an average latency of each of a plurality of links between the server and a storage device comprises:
   obtaining latencies of n input/output (I/O) requests transmitted over each link in preset duration, wherein $n \geq 2$;
   determining an average value of the latencies of the n I/O requests transmitted over each link; and
   determining the average value of the latencies of the n I/O requests transmitted over each link as the average latency of each link.

5. The method according to claim 2, wherein before the determining a latency interval to which the average latency of each link belongs, the method further comprises:
   determining the at least two consecutive latency intervals when it is detected that the latency fluctuation value of the at least one of the plurality of links exceeds the preset threshold.

6. A server, comprising:
   a memory storing instructions; and
   a processor coupled to the memory to execute the instructions to:
   calculate an average latency of each of a plurality of links between the server and a storage device, including detecting a latency fluctuation value of each link; and
   calculating the average latency of each of the plurality of links between the server and the storage device when a latency fluctuation value of at least one of the plurality of links is greater or equal to a preset threshold;
   determine a latency interval to which the average latency of each link belongs, wherein at least two consecutive latency intervals are preset in the server, each latency interval represents a range of an average latency, a priority is set for each latency interval, and for latency intervals of adjacent priorities, a minimum latency value of a latency interval of a lower priority is greater than a maximum latency value of a latency interval of a higher priority;
   determine a priority of each link based on a priority of the latency interval to which the average latency of each link belongs; and
   select one or more links with a highest priority for data transmission, wherein the data is transmitted using the selected one or more links.

7. The server according to claim 6,
   wherein
   the latency fluctuation value $s=\exp(\sqrt{((\Sigma_{j=1}{}^{n}(\ln(p_j/Pa)^2))/n)})$, Pa represents an average value of latencies of n input/output (I/O) requests transmitted over each link in preset duration, $p_j$ represents a latency of a $j^{th}$ I/O request in the latencies of the n I/O requests, $1 \leq j \leq n$, and $n \geq 2$.

8. The server according to claim 6, wherein when performing the operation of calculating an average latency of each of a plurality of links between the server and a storage device, the processor is configured to:
   detect whether a change occurs on the links between the server and the storage device; and
   calculate the average latency of each of the plurality of links between the server and the storage device when a change occurs on the links between the server and the storage device.

9. The server according to claim 6, wherein when performing the operation of calculating an average latency of each of a plurality of links between the server and a storage device, the processor is configured to:
   obtain latencies of n input/output (I/O) requests transmitted over each link in preset duration, wherein $n \geq 2$;
   determine an average value of the latencies of the n I/O requests transmitted over each link; and
   determine the average value of the latencies of the n I/O requests transmitted over each link as the average latency of each link.

10. The server according to claim 7, wherein before performing the operation of determining a latency interval to which the average latency of each link belongs, the processor is further configured to:
    determine the at least two consecutive latency intervals when it is detected that the latency fluctuation value of the at least one of the plurality of links exceeds the preset threshold.

11. A non-transitory computer readable storage medium having instructions stored therein, which when executed by a processor, cause the processor to perform operations, the operations comprising:
    calculating an average latency of each of a plurality of links between a server and a storage device, including detecting a latency fluctuation value of each link; and
    calculating the average latency of each of the plurality of links between the server and the storage device when a latency fluctuation value of at least one of the plurality of links is greater or equal to a preset threshold;
    determining a latency interval to which the average latency of each link belongs, wherein at least two consecutive latency intervals are preset in the server, each latency interval represents a range of an average latency, a priority is set for each latency interval, and for latency intervals of adjacent priorities, a minimum latency value of a latency interval of a lower priority is greater than a maximum latency value of a latency interval of a higher priority;
    determining a priority of each link based on a priority of the latency interval to which the average latency of each link belongs; and
    selecting one or more links with a highest priority for data transmission, wherein the data is transmitted using the selected one or more links.

12. The non-transitory computer readable storage medium according to claim 11,
    wherein
    the latency fluctuation value $s=\exp(\sqrt{((\Sigma_{j=1}{}^{n}(\ln(p_j/Pa)^2))/n)})$, Pa represents an average value of latencies of n input/output (I/O) requests transmitted over each link in preset duration, $p_j$ represents a latency of a $j^{th}$ I/O request in the latencies of the n I/O requests, $1 \leq j \leq n$, and $n \geq 2$.

13. The non-transitory computer readable storage medium according to claim 11, wherein the calculating an average latency of each of a plurality of links between the server and a storage device comprises:
   detecting whether a change occurs on the links between the server and the storage device; and
   calculating the average latency of each of the plurality of links between the server and the storage device when a change occurs on the links between the server and the storage device.

14. The non-transitory computer readable storage medium according to claim 11, wherein the calculating an average latency of each of a plurality of links between the server and a storage device comprises:
   obtaining latencies of n input/output (I/O) requests transmitted over each link in preset duration, wherein n≥2;
   determining an average value of the latencies of the n I/O requests transmitted over each link; and
   determining the average value of the latencies of the n I/O requests transmitted over each link as the average latency of each link.

15. The non-transitory computer readable storage medium according to claim 12, wherein before the determining a latency interval to which the average latency of each link belongs, the method further comprises:
   determining the at least two consecutive latency intervals when it is detected that the latency fluctuation value of the at least one of the plurality of links exceeds the preset threshold.

* * * * *

UNITED STATES PATENT AND TRADEMARK OFFICE
CERTIFICATE OF CORRECTION

PATENT NO. : 11,356,386 B2
APPLICATION NO. : 15/931877
DATED : June 7, 2022
INVENTOR(S) : Feng Yang It is certified that error appears in the above-identified patent and that said Letters Patent is hereby corrected as shown below:

In the Claims

In Claim 1, Column 18, Line 63-65, "selecting one or more links with a highest priority for data transmission, wherein the data is transmitted using the selected one or more links." should be -- selecting one or more links with a highest priority for data transmission. --.

In Claim 4, Column 19, Line 19-20, "obtaining latencies of n input/output (I/O) requests trans- 20 mitted over each link in preset duration," should be -- obtaining the latencies of the n input/output (I/O) requests transmitted over each link in the preset duration, --.

In Claim 4, Column 19, Line 21, "determining an average value of the latencies" should be -- determining the average value of the latencies --.

In Claim 6, Column 19, Line 56-58, "selecting one or more links with a highest priority for data transmission, wherein the data is transmitted using the selected one or more links." should be -- selecting one or more links with a highest priority for data transmission. --.

In Claim 9, Column 20, Line 16-17, "obtaining latencies of n input/output (I/O) requests trans- 20 mitted over each link in preset duration," should be -- obtaining the latencies of the n input/output (I/O) requests transmitted over each link in the preset duration, --.

In Claim 9, Column 20, Line 18, "determining an average value of the latencies" should be -- determining the average value of the latencies --.

In Claim 11, Column 20, Line 56-58, "selecting one or more links with a highest priority for data transmission, wherein the data is transmitted using the selected one or more links." should be -- selecting one or more links with a highest priority for data transmission. --.

In Claim 14, Column 21, Line 15-16, "obtaining latencies of n input/output (I/O) requests trans- 20 mitted over each link in preset duration," should be -- obtaining the latencies of the n input/output Signed and Sealed this
Eleventh Day of October, 2022

Katherine Kelly Vidal
*Director of the United States Patent and Trademark Office*

(I/O) requests transmitted over each link in the preset duration, --.

In Claim 14, Column 21, Line 17, "determining an average value of the latencies" should be -- determining the average value of the latencies --.